(12) United States Patent
Lombardo et al.

(10) Patent No.: US 7,004,668 B2
(45) Date of Patent: Feb. 28, 2006

(54) CONNECTOR FOR FLEX SHAFT FOR STRING TRIMMER

(75) Inventors: Fred Lombardo, Chandler, AZ (US); Michael Mitchell, Gilbert, AZ (US)

(73) Assignee: MTD Products Inc, Cleveland, OH (US)

( * ) Notice: Subject to any disclaimer, the term of this patent is extended or adjusted under 35 U.S.C. 154(b) by 30 days.

(21) Appl. No.: 10/272,383

(22) Filed: Oct. 16, 2002

(65) Prior Publication Data

US 2004/0076467 A1 Apr. 22, 2004

(51) Int. Cl.
*F16B 7/00* (2006.01)

(52) U.S. Cl. .................. 403/293; 403/333; 403/334; 403/383; 464/52

(58) Field of Classification Search .............. 403/333, 403/334, 404, 409.1, 359.6, 383, 292, 293; 464/50, 52; 74/500.5, 502.6; 411/403, 919
See application file for complete search history.

(56) References Cited

U.S. PATENT DOCUMENTS

| | | | |
|---|---|---|---|
| 1,601,099 A | 9/1926 | Arens | |
| 1,678,335 A | 7/1928 | Gaston | |
| 1,775,402 A | 9/1930 | Mandl | |
| 1,871,528 A | 8/1932 | Joline | |
| 2,319,409 A | 5/1943 | Latimer | |
| 2,370,884 A | 3/1945 | Smith | |
| 2,704,005 A | 3/1955 | Clayson | |
| 2,869,907 A | 1/1959 | Deliso | |
| 2,917,909 A | 12/1959 | Josutis | |
| 3,440,836 A | 4/1969 | Petersen | |
| 3,481,156 A | 12/1969 | De Csipkes | |
| 3,505,831 A | 4/1970 | Palmer et al. | |
| 3,540,123 A | 11/1970 | Yamada | |
| 3,855,817 A | 12/1974 | Stuemky et al. | |
| 3,977,078 A | 8/1976 | Pittinger, Jr. | |
| 4,057,114 A | 11/1977 | Anderson | |
| 4,126,063 A * | 11/1978 | Palmer | 81/124.6 |
| 4,126,928 A | 11/1978 | Hoff | |
| 4,226,021 A | 10/1980 | Hoff | |
| 4,242,855 A | 1/1981 | Beaver, Jr. | |
| 4,286,675 A | 9/1981 | Tuggle | |
| 4,416,644 A * | 11/1983 | Kulischenko et al. | 464/52 |
| 4,451,983 A | 6/1984 | Johnson et al. | |
| 4,483,070 A | 11/1984 | Junkermann | |
| 4,541,160 A | 9/1985 | Roberts | |
| 4,575,356 A * | 3/1986 | Murohushi et al. | 464/52 |
| 4,653,254 A | 3/1987 | Qualls | |
| H380 H | 12/1987 | Yokocho | |
| 4,989,323 A | 2/1991 | Casper et al. | |
| 5,035,055 A | 7/1991 | McCullough | |
| 5,062,734 A | 11/1991 | Vanzee et al. | |
| 5,215,413 A * | 6/1993 | Nance | 403/259 |
| 5,333,963 A | 8/1994 | Blumentrath | |
| 6,003,411 A * | 12/1999 | Knox et al. | 81/53.2 |
| 6,122,830 A * | 9/2000 | Jarzombek | 464/52 X |
| 6,626,067 B1 * | 9/2003 | Iwinski et al. | 411/403 X |

FOREIGN PATENT DOCUMENTS

EP 0 411 399 A 2/1991
FR 2 376 328 7/1978

* cited by examiner

*Primary Examiner*—Daniel P. Stodola
*Assistant Examiner*—Michael P. Ferguson
(74) *Attorney, Agent, or Firm*—Wegman Hessler & Vanderbur

(57) ABSTRACT

An improved connector for flex shafts for a string trimmer has an input area and a drive area, where the input area of the connector has a modified diamond shape with sloping sides. This diamond shape allows for easy and reliable connection of the driven working end.

9 Claims, 8 Drawing Sheets

CONNECTOR FOR FLEX SHAFT FOR STRING TRIMMER

BACKGROUND OF THE INVENTION

A. Field of Invention

This invention pertains to the art of methods and apparatuses for flexible drive shafts for rotary power tools and more particularly to a flexible drive shaft with a connector that allows interchange of driven working ends.

B. Description of the Related Art

Flexible shafts comprise basic elements of power transmission and are designed to transmit power or control from a driving element to an element to be driven. Transmission may be over, under, or around obstacles or objects where transmission by solid shafts would be impractical or impossible.

In a typical rotatable flexible shaft, a wire mandrel has a plurality of layers of closely coiled wire wound thereover, each of the layers being successively wound over another in alternately opposing directions, i.e., right or left-hand lay. This shaft is usually covered by a flexible casing, metallic or covered, and a clearance between the shaft and casing is provided in order that the shaft may rotate freely within the casing.

Rotatable flexible shafts are of two basic types—power driven and remotely controlled. Power driven flexible shafts are designed primarily for motor-driven or high-speed operation in one direction. Remote control flexible shafts, on the other hand, are designed primarily for hand-operated control in either direction.

Power driven flexible shafts have two general classes of application—those in which there is relative movement between the driving and driven elements, and the curvature and twisting of the shaft is continually changing, as when, for example, a driven element such as a portable grinding tool is continuously moved about the workpiece by an operator and those in which the shaft operates in a given position and the curve, or curves, of the shaft remain substantially fixed, as in the coupling arrangement of the present invention wherein a shaft is used to transmit torque from a motor to a trimmer, for example. In a typical arrangement of this type, a fitting is permanently affixed to each end of the flexible shaft and the fitting suitably respectively connected to the output shaft of the motor and input shaft of the driven member.

It is known in the art to use a flexible drive shaft in a rotary power tool, such as a flexible line trimmer. It is also known in the art to include a connector-type connection that allows for the attachment of any one of many different driven working member to the rotary power tool.

One problem with existing flexible drive shaft connections is the tendency for the connection to "strip" or break with use. Another problem with the existing connection designs is that it is difficult to effectively and completely insert the working member into the connection. This causes improper performance of the combination and can result in damage to the connection and/or drive shaft.

The present invention provides for a flexible drive shaft with an improved connector connection for rotary power tools.

SUMMARY OF THE INVENTION

In accordance with one aspect of the present invention, a connector includes first and second ends, a longitudinal axis, a drive area, the drive area having a width $W_1$ and a depth $D_1$, and an input area adjacent to the first end, the input area having at least one side, wherein the input area is used to guide an associated input shaft of an associated driven member into the drive area, the input area having a width $W_2$ and a depth $D_2$, wherein the drive area is adjacent to the input area, wherein the at least one side slopes inward toward the drive area at an angle $\alpha_1$ with respect to the longitudinal axis, wherein the angle $\alpha_1$ is in the range from about 21° to about 34°, wherein the at least one side having points a, b, c, wherein the points a, b, and c form an obtuse angle $\alpha_2$, wherein $\alpha_2$ is in the range from about 162° to about 174°.

In accordance with another aspect of the present invention, the ratio of $D_1$ to $D_2$ is in the range from about 1:0.3125 to about 1:1.25.

In accordance with another aspect of the present invention, the ratio of $W_1$ to $W_2$ is in the range from about 1:1.8 to about 1:3.2.

In accordance with another aspect of the present invention, the ratio of $D_1$ to $D_2$ is about 1:0.55 and the ratio of $W_1$ to $W_2$ is about 1:2.11.

In accordance with another aspect of the present invention, the angle $\alpha_1$ is about 24°.

In accordance with another aspect of the present invention, the angle $\alpha_2$ is about 168°.

In accordance with another aspect of the present invention, $W_1$ is about 0.205 inches.

In accordance with another aspect of the present invention, $W_2$ is about 0.432 inches.

In accordance with another aspect of the present invention, $D_1$ is at least 0.4 inches.

In accordance with another aspect of the present invention, $D_2$ is at least 0.125 inches, but not more than 0.5 inches.

In accordance with another aspect of the present invention, the connector is made of zinc.

In accordance with another aspect of the present invention, the connector includes at least a second side, wherein the at least a second side slopes inward toward the drive area at an angle $\alpha_1$ with respect to the longitudinal axis, wherein the angle $\alpha_1$ is in the range from about 21° to about 34°, wherein the at least one side having points c, g, and h, wherein the points c, g, and h form an obtuse angle $\alpha_3$, wherein $\alpha_3$ is in the range from about 162° to about 174°.

In accordance with still another aspect of the present invention, the connector further includes at least a third side, wherein the at least a third side slopes inward toward the drive area at an angle $\alpha_1$ with respect to the longitudinal axis, wherein the angle $\alpha_1$ is in the range from about 21° to about 34°, wherein the at least one side having points h, i, and j, wherein the points h, i, and j form an obtuse angle $\alpha_4$, wherein $\alpha_4$ is in the range from about 162° to about 174°.

In accordance with still another aspect of the present invention, the connector further includes at least a fourth side, wherein the at least a fourth side slopes inward toward the drive area at an angle $\alpha_1$ with respect to the longitudinal axis, wherein the angle $\alpha_1$ is in the range from about 21° to about 34°, wherein the at least one side having points j, k, and c, wherein the points j, k, and c form an obtuse angle $\alpha_5$, wherein $\alpha_5$ is in the range from about 162° to about 174°, the at least one side being connected to the at least a second side at point a, the at least a second side being connected to the at least a third side at point h, the at least a third side being connected to the at least a fourth side at point j, and the at least a fourth side being connected to the at least one side at point c.

In accordance with yet another aspect of the present invention a connector input area includes a first and second end, at least one side, wherein the input area is used to guide an associated flexible shaft of an associated driven member into the drive area, the input area having a width $W_2$ and a depth $D_2$, wherein the drive area is adjacent to the input area, wherein the at least one side slopes inward toward the drive area at an angle $\alpha_1$ with respect to the longitudinal axis, wherein the angle $\alpha_1$ is in the range from about 21° to about 34°, wherein the at least one side having points a, b, c, wherein the points a, b, and c form an obtuse angle $\alpha_2$, wherein $\alpha_2$ is in the range from about 162° to about 174°, a width $W_2$, and a depth $D_2$.

In accordance with still another aspect of the present invention, the connector input area further includes at least a second side, wherein the at least a second side slopes inward toward the drive area at an angle $\alpha_1$ with respect to the longitudinal axis, wherein the angle $\alpha_1$ is in the range from about 21° to about 34°, wherein the at least one side having points c, g, and h, wherein the points c, g, and h form an obtuse angle $\alpha_3$, wherein $\alpha_3$ is in the range from about 162° to about 174°.

In accordance with another aspect of the invention, the input area further includes at least a third side, wherein the at least a third side slopes inward toward the drive area at an angle $\alpha_1$ with respect to the longitudinal axis, wherein the angle $\alpha_1$ is in the range from about 21° to about 34°, wherein the at least one side having points h, i, and j, wherein the points h, i, and j form an obtuse angle $\alpha_4$, wherein $\alpha_4$ is in the range from about 162° to about 174°.

In accordance with another aspect of the present invention, the input area includes at least a fourth side, wherein the at least a fourth side slopes inward toward the drive area at an angle $\alpha_1$ with respect to the longitudinal axis, wherein the angle $\alpha_1$ is in the range from about 21° to about 34°, wherein the at least one side having points j, k, and c, wherein the points j, k, and c form an obtuse angle $\alpha_5$, wherein $\alpha_5$ is in the range from about 162° to about 174°, the at least one side being connected to the at least a second side at point a, the at least a second side being connected to the at least a third side at point h, the at least a third side being connected to the at least a fourth side at point j, and the at least a fourth side being connected to the at least one side at point c.

In accordance with another aspect of the present invention, the connector is made of zinc.

In accordance with another aspect of the present invention, the connector is permanently attached to an associated drive shaft.

In accordance with another aspect of the present invention, the input is diamond shaped.

In accordance with another aspect of the present invention, $W_1$ is greater than about 0.205 inches.

In accordance with another aspect of the present invention, $W_2$ is greater than about 0.372 inches.

In accordance with another aspect of the present invention, $W_2$ is less than about 0.654 inches.

In accordance with another aspect of the present invention, $D_1$ is greater than about 0.4 inches.

In accordance with another aspect of the present invention, $D_2$ is greater than about 0.125 inches.

In accordance with another aspect of the present invention, $D_2$ is less than about 0.5 inches.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF AT LEAST ONE EMBODIMENT

Figure 1:
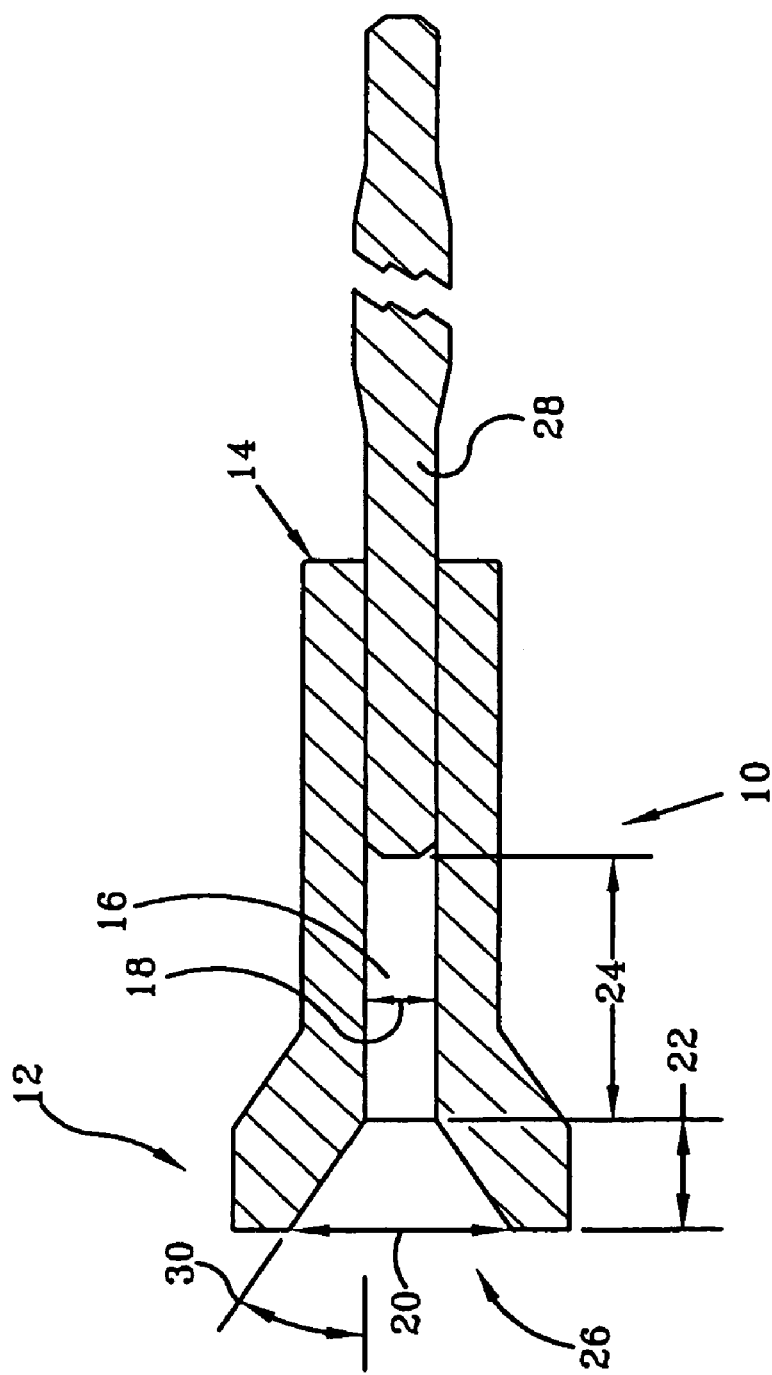
FIG. 1 is a partial sectional view of an embodiment of the flexible drive shaft connector connection.
Figure 2:
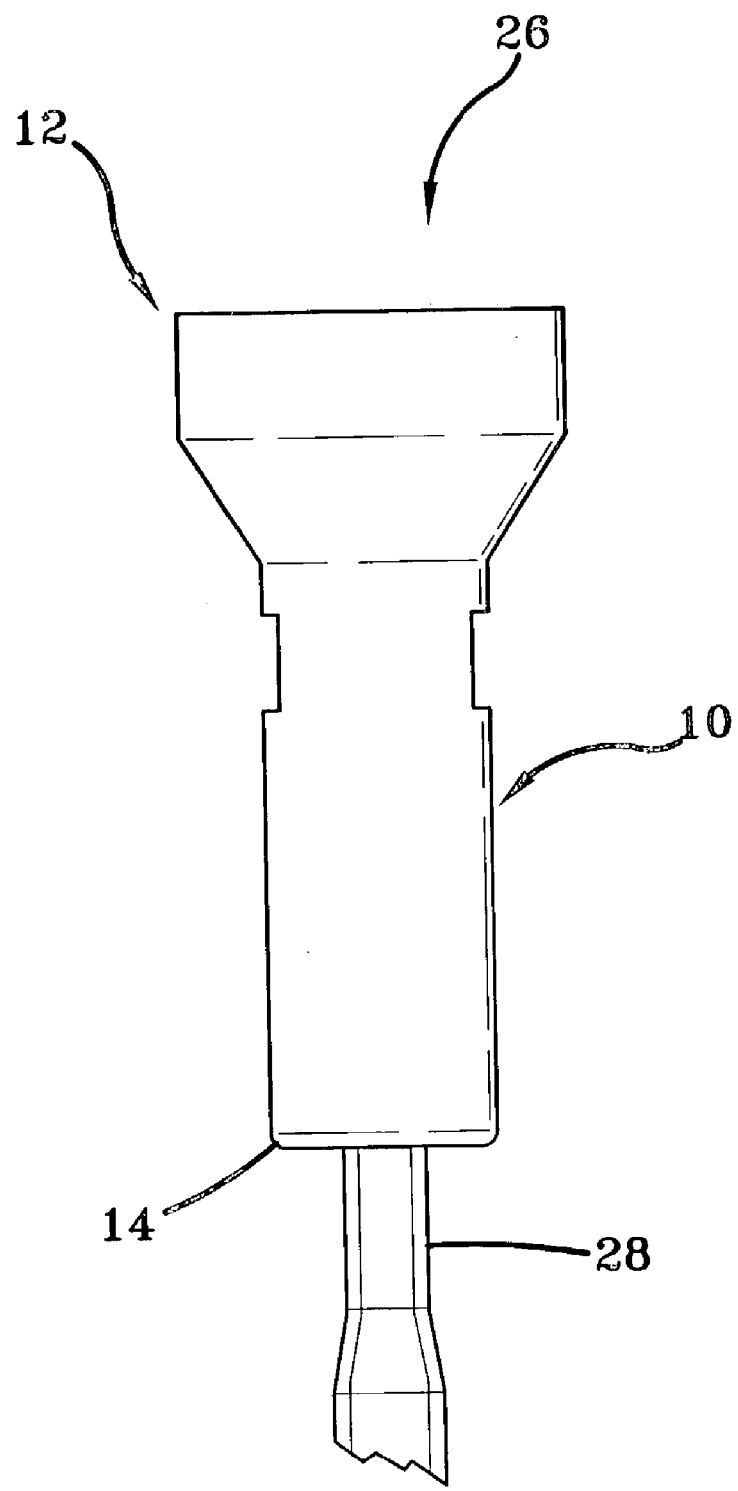
FIG. 2 is an axial view of the same.
Figure 3:
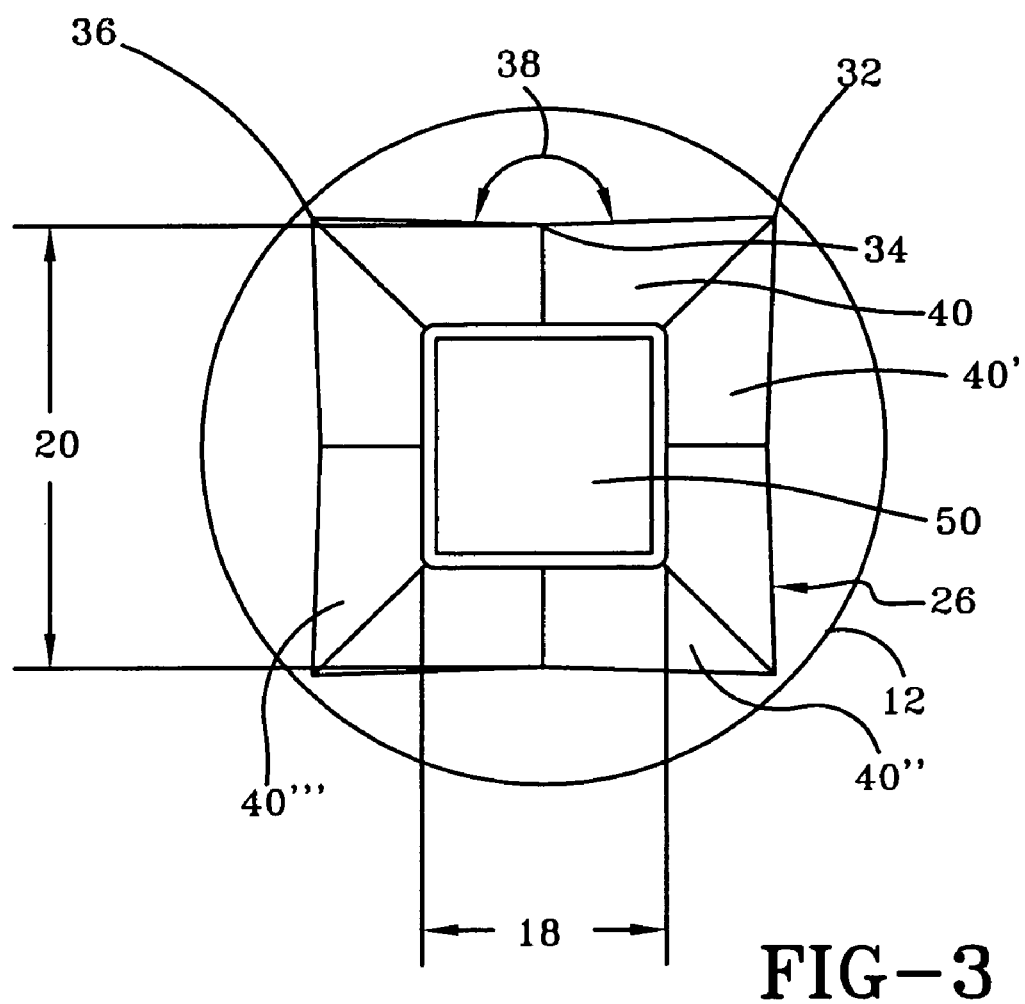
FIG. 3 is a partial elevation view of the same.
Figure 5:
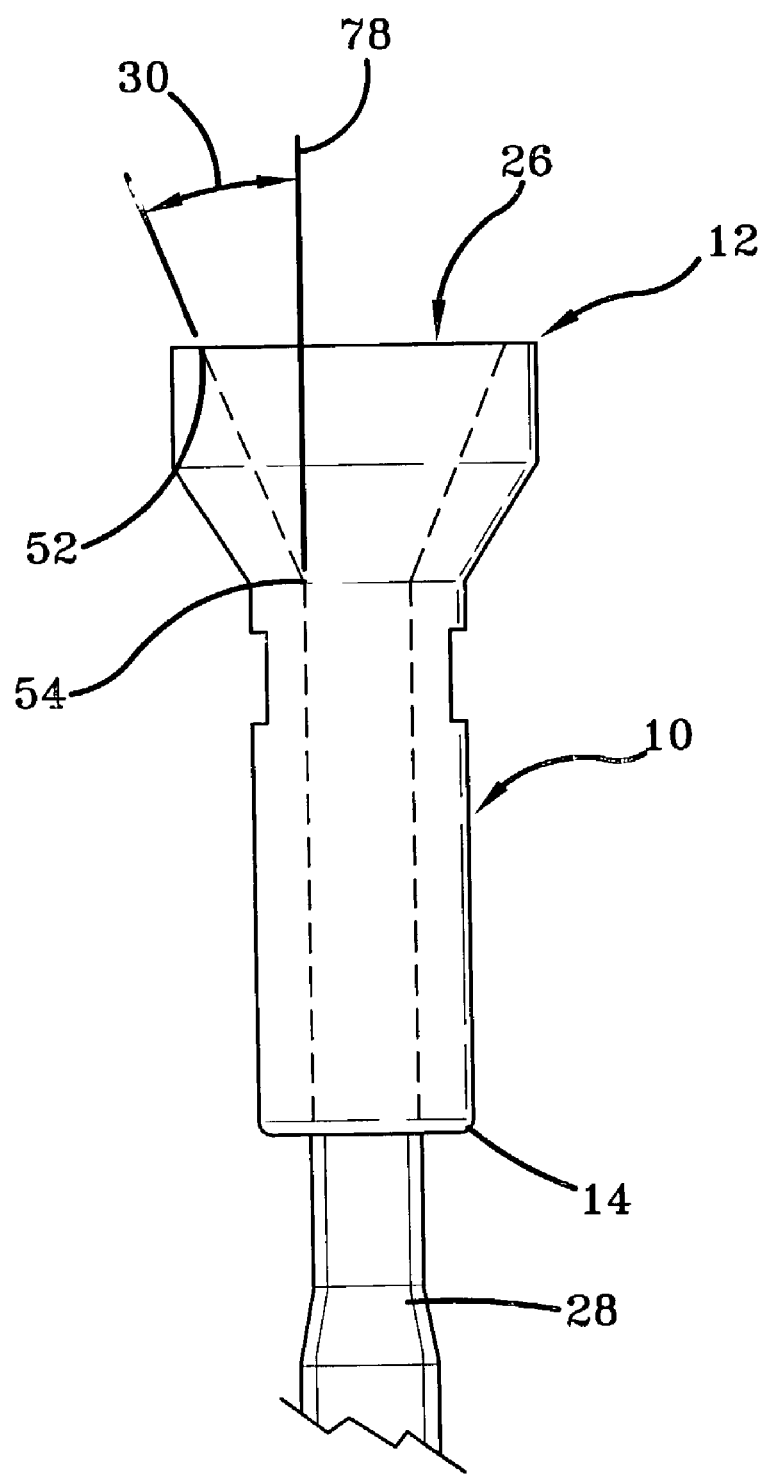
FIG. 5 is an axle view of the drive shaft connector, showing the input area and drive areas.
Figure 6:
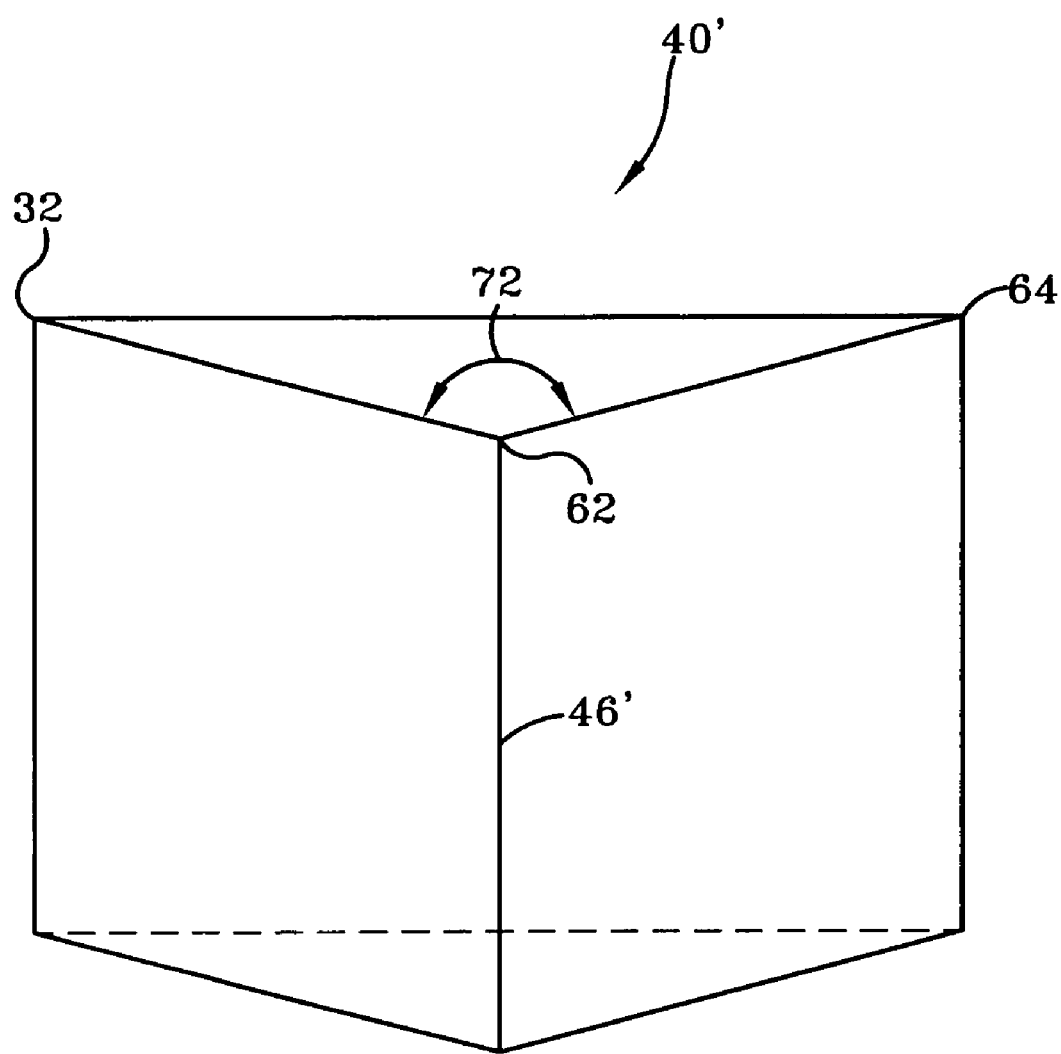
FIG. 6 is a front view of a second side of the input area.
Figure 7:
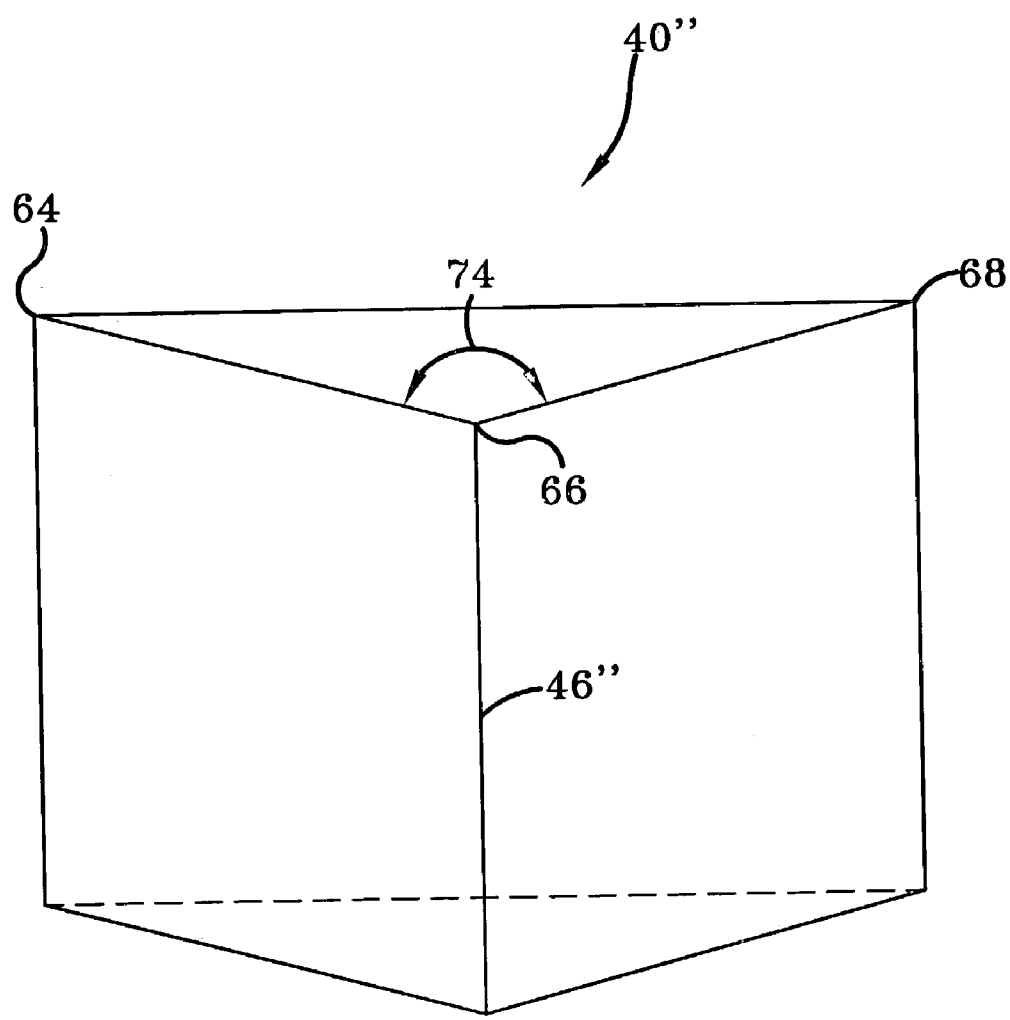
FIG. 7 is a front view of a third side of the input area.
Figure 8:
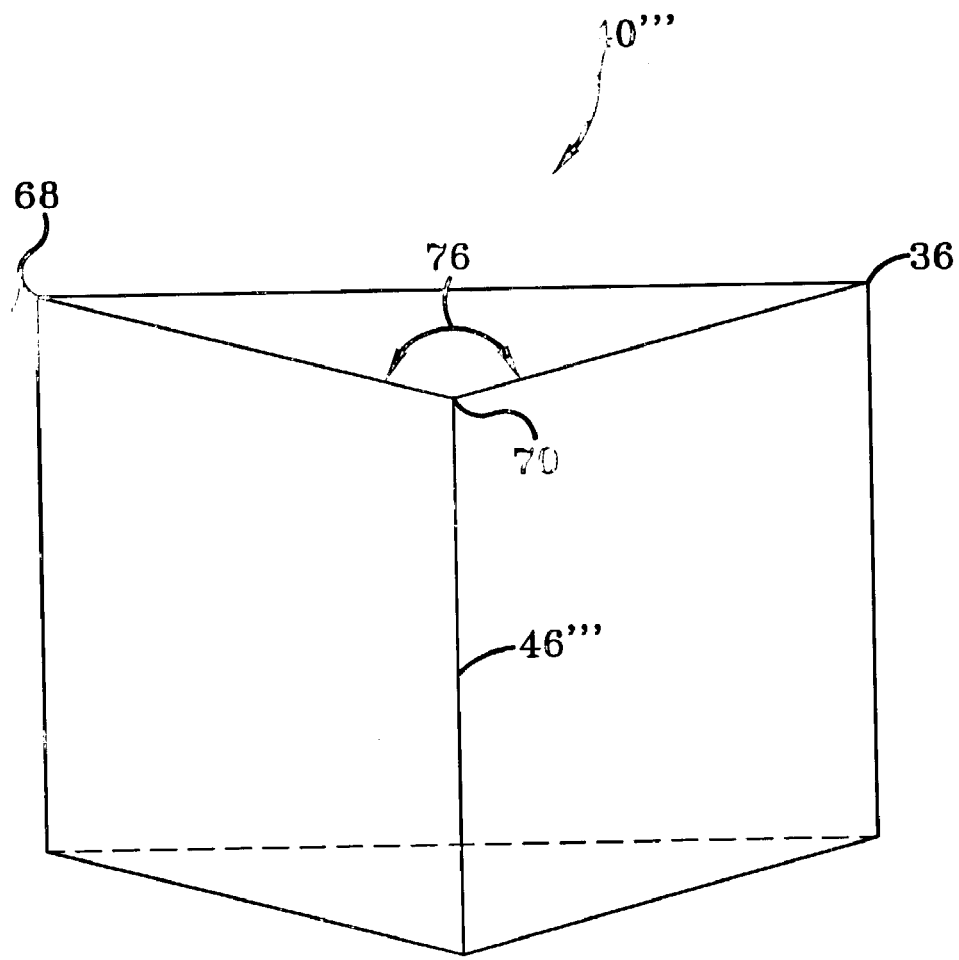
FIG. 8 is a front view of a fourth side of the input area.

Referring now to the drawings wherein the showings are for purposes of illustrating at least one embodiment of the invention only and not for purposes of limiting the same, FIGS. 1, 2, and 5 show a new and improved connector 10 for a flexible shaft (not shown), wherein the connector 10 has a drive area 16, an input area 26, a longitudinal axis 78, first end 12, and second end 14. The drive area 16 has a depth 24. The input area 26 has a first end 52, a second end 54, a depth 22, a width 20, and a width 18, with width 20 being measured the first end 52, and the width 18 being measured at the second end 54. The width 20 is wider than the width 18, and wider than the flexible shaft (not shown) for easier insertion of the flexible shaft.

With continuing reference to FIGS. 1, 2, and 5, the connector 10 is connected to the drive shaft 28 at second end 14. In this embodiment, the width 18 is at least about 0.205 inches, the width 20 is between about 0.372 inches and about 0.654 inches. The depth 24 is at least about 0.4 inches, and the depth 22 is between about 0.125 inches and about 0.5 inches.

Figure 4:
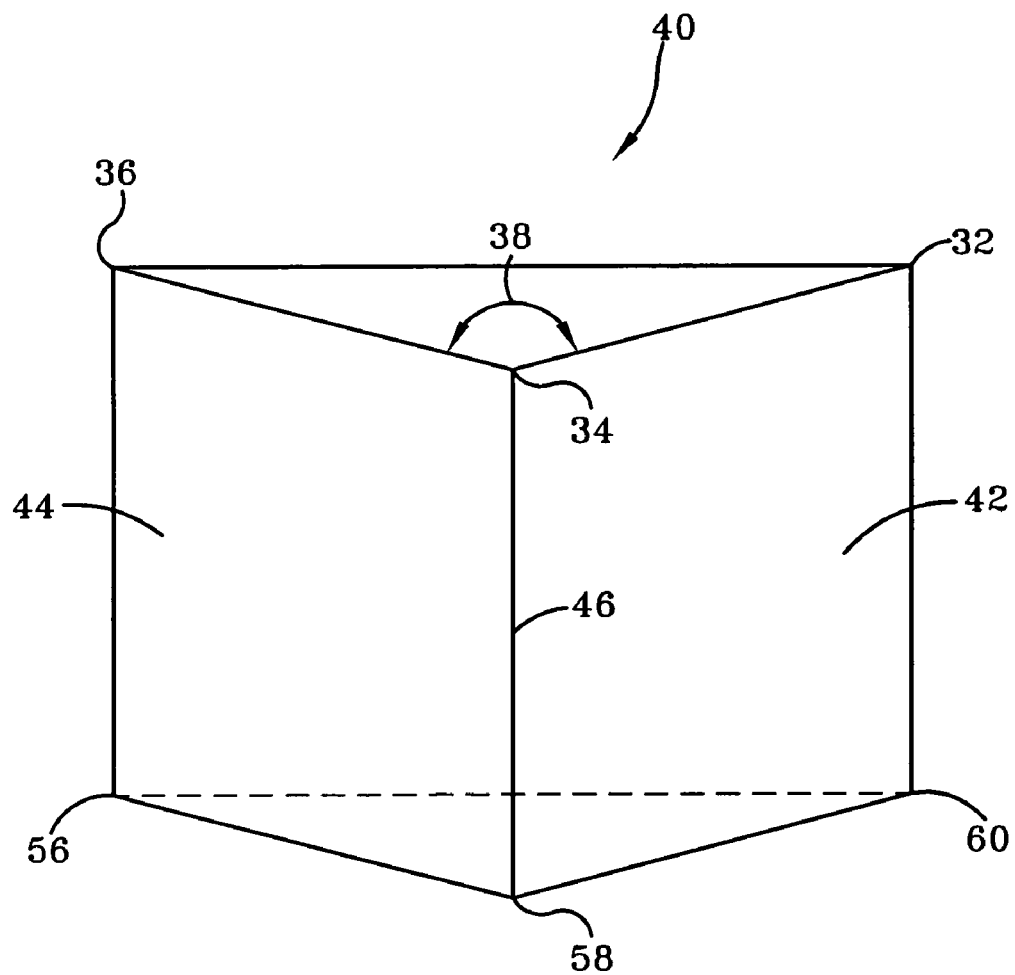
FIG. 4 is front view of one of the sides of the input area.

With reference now to FIGS. 1–8, the input area 26 has four sides 40, 40', 40", 40"', width $W_2$ 20, drive opening 50, an angle 30, and an angle 38. Side 40 has an apex 46, a point 32, point 34, and point 36. The angle 38 created by points 32, 34, 36 is between 162° and 174°. FIG. 4 shows side 40 of the input area 26. The side 40, at point 34 is angled away from the center of the input area 26. The side 40, at point 34, slopes downwardly from point 34 to point 58. This angle at points 34, 58 is angle 30.

With continuing reference to FIGS. 3 and 5–8, side 40' has point 32, point 62, point 64, and angle 72. Points 32, 62, 64 form angle 72, which in this embodiment is between 162° and 174°. Side 40" has point 64, point 66, point 68, and angle 74. Points 64, 66, 68 form angle 74, which in this embodiment is between 162° and 174°. Side 40"' has point 68, point 70, point 36, and angle 76. Points 68, 70, 36 form angle 76, which in this embodiment is between 162° and 174°. Side 40' is connected to side 40 at point 32 and to side 40" at point 64, side 40" is connected to side 40"' at point 68, and side 40"' is connected to side 40 at point 36.

Each side 40, 40', 40", 40"' has an angle 30. This angle 30 for each side 40, 40', 40", 40"' is between 21° and 34° in this embodiment. The angle 30 is measured at points 34, 62, 66, 70. However, it is to be understood that the angle 30 will increase as the sides 40, 40', 40", 40'" progress from points 34, 62, 66, 70 to either points 32, 64, 68, 36 or points 36, 32, 64, 68, respectively. The angles 30, 38, 72, 74, 76 of the sides 40, 40', 40", 40'" allow the associated flexible shaft (not shown) to be easily and completely inserted into the drive area 16, which will prevent the stripping or breaking of the shaft caused by improper connection.

When the shaft is inserted into the input area 26, the shaft may be slightly off-center with respect to the drive opening 50. In this case, the shaft would contact one of the sides 40, 40', 40", 40'". The $\alpha_1, \alpha_2, \alpha_3, \alpha_4, \alpha_5$ 30, 38, 72, 74, 76 of the sides 40, 40', 40", 40'" direct the shaft down into the drive opening 50, thereby ensuring a proper connection.

In this embodiment of the invention, the connector 10 is made of zinc, which will prevent breakage or accelerated wear of the connector 10. This also ensures that the torque created by the rotary power tool will be transferred efficiently from the drive shaft 28 to the driven working end (not shown). The connection of the connector 10 to the drive shaft 28, in one embodiment, can be a permanent connection. This ensures efficient transfer of the torque, as well as preventing malfunction of the flexible drive shaft/connector interconnection.

Although the above embodiments have referenced a flexible shaft, it is to understood that the invention is not limited by the type of shaft, and a rigid shaft could be used as well.

At least one embodiment has been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed: We claim:

1. A drive shaft connector assembly comprising a drive shaft connector adapted to receive a flexible drive shaft of a driven member for transmission of power in a rotary power tool, the connector comprising a connector body having an open first end and second end connected to a drive shaft with a longitudinal axis defined as running between said first end and said second end, the connector assembly comprising:
    a flexible drive shaft of a driven member in a rotary power tool;
    a drive shaft connected to the second end of the connector body; and
    the connector comprising:
    a drive area; and,
    an input area at the first end and adjacent said drive area guiding the flexible shaft of the driven member into the drive area, the input area consisting of four substantially similar sides, each side comprising a first point, a second point, a third point and a fourth point, wherein each side consists of a first planer surface defined by the first, second and fourth points and a second planer surface defined by the second, third and fourth points, said first and second surfaces converging at an apex bisecting each side such that said first and second planer surfaces are mirror images of each other, with the second and fourth points being positioned on said apex, wherein said apex slopes inward toward the drive area at a first angle with respect to the longitudinal axis, wherein the first angle is in the range from about 21° to about 34°, and wherein the first, second and third points define an outward edge of the open input area and form an obtuse angle, wherein the second angle is in the range from about 162° to about 174°.

2. The connector assembly of claim 1, wherein the drive area has a width and a depth and the input area has a width and a depth, wherein the ratio of the drive area depth to the input area depth is in the range from about 1:0.3125 to about 1:1.25 and the ratio of the drive area width to the input area width is in the range from about 1:1.8 to about 1:3.2.

3. The connector assembly of claim 2, wherein the ratio of the drive area depth to the input area depth is about 1:0.55 and the ratio of the drive area width to the input area width is about 1:2.11.

4. The connector assembly of claim 2, wherein the drive area width is about 0.205 inches.

5. The connector assembly of claim 2, wherein the input area width is about 0.432 inches.

6. The connector assembly of claim 2, wherein the drive area depth is at least 0.4 inches.

7. The connector assembly of claim 2, wherein the input area depth is at least 0.125 inches, but not more than 0.5 inches.

8. The connector assembly of claim 1, wherein the first angle is about 24° and the second angle is about 168°.

9. The connector assembly of claim 1, wherein the connector is made of zinc.

* * * * *